United States Patent

Kerth et al.

[11] Patent Number: 5,288,824
[45] Date of Patent: Feb. 22, 1994

[54] PREPARATION OF HOMO- AND COPOLYMERS OF PROPENE BY MEANS OF A ZIEGLER-NATTA CATALYST SYSTEM

[75] Inventors: Juergen Kerth, Carlsberg; Rainer Hemmerich, Gruenstadt; Peter Koelle, Ludwigshafen; Patrik Mueller, Kaiserslautern, all of Fed. Rep. of Germany

[73] Assignee: BASF Aktiengesellschaft, Ludwigshafen, Fed. Rep. of Germany

[21] Appl. No.: 934,848

[22] Filed: Aug. 25, 1992

[30] Foreign Application Priority Data

Aug. 30, 1991 [DE] Fed. Rep. of Germany ....... 4128829

[51] Int. Cl.$^5$ .................................................. C08F 4/64
[52] U.S. Cl. ..................................... 526/128; 526/351; 502/107; 502/125; 502/127
[58] Field of Search .......................................... 526/128

[56] References Cited

U.S. PATENT DOCUMENTS

| | | | |
|---|---|---|---|
| 4,857,613 | 8/1989 | Zolk et al. | 526/128 |
| 5,081,088 | 1/1992 | Koelle et al. | 502/107 |
| 5,126,302 | 6/1992 | Masino | 526/125 |

*Primary Examiner*—Bernard Lipman
*Assistant Examiner*—David Wu
*Attorney, Agent, or Firm*—Keil & Weinkauf

[57] ABSTRACT

Polymers of propene are prepared using a Ziegler-Natta catalyst system comprising (1) titanium component which is based on a finely divided, shape-imparting silica gel and contains titan- ium, magnesium, chlorine and a benzenecarboxylic acid derivative, (2) an aluminum component and (3) a silane component. The process employs a titanium component (1) which is obtained by a method in which (1.1) first (I) a carrier is prepared from (Ia) a silica gel which has a relatively high moisture content, (Ib) an organomagnesium compound and (Ic) a gaseous chlorinating agent in a manner such that (1.1.1) first (Ia) is reacted with (Ib), (1.1.2) then (Ic) is passed into the mixture obtained from (1.1.1), (1.2) then a solid-phase intermediate is prepared from (I), (II) an alkanol, (III) titanium tetrachloride and (IV) a phthalic acid derivative in a manner such that (1.2.1) first (I) is reacted with (II), (1.2.2) then (III) is introduced into the mixture resulting from (1.2.1), with the proviso that (IV) is also introduced in (1.2.1) or (1.2.2), (1.3) then the solid-phase intermediate resulting from (1.2) is extracted with titanium tetrachloride or with a titanium tetrachloride/-hydrocarbon mixture and (1.4) finally the solid-phase product resulting from (1.3) is washed with a liquid hydrocarbon.

1 Claim, No Drawings

PREPARATION OF HOMO- AND COPOLYMERS OF PROPENE BY MEANS OF A ZIEGLER-NATTA CATALYST SYSTEM

The present invention relates to a process for the preparation of homopolymers of propene and copolymers of propene with minor amounts of other $C_2$–$C_{12}$-α-monoolefins, in particular $C_2$–$C_6$-α-monoolefins, by polymerization, in particular by dry phase polymerization, of the monomer or monomers at from 20° to 160° C., in particular from 50° to 120° C., and from 1 to 100, in particular from 20 to 70, bar by means of a Ziegler-Natta catalyst system comprising (1) a titanium component which is based on a finely divided, shape-imparting silica gel and contains titanium, magnesium, chlorine and a benzenecarboxylic acid derivative, (2) an aluminum component of the formula $$AlR_3$$

where R is alkyl of not more than 8, in particular not more than 4, carbon atoms, and (3) a silane component of the formula $$R_n^1Si(OR^2)_{4-n}$$

where $R^1$ is a saturated aliphatic and/or aromatic hydrocarbon radical of not more than 16, preferably not more than 10, carbon atoms, $R^2$ is alkyl of not more than 15, preferably not more than 8, in particular not more than 4, carbon atoms and n is from 0 to 3, preferably from 0 to 2, in particular 1 or 2, with the provisos that the atomic ratio of titanium from the titanium component (1) to aluminum from the aluminum component (2) is from 1:10 to 1:800, in particular from 1:20 to 1:300, and a molar ratio of the aluminum component (2) to the silane component (3) is from 1:0.01 to 1:0.8, in particular from 1:0.02 to 1:0.5.

Polymerization processes of this type are known; their special feature compared with other similar processes is the specific embodiment of the catalyst system, and the process disclosed in EP-A 306 867 may be mentioned as a prototype for the present case.

The purpose of the specific embodiments of the catalyst systems is to achieve certain aims, such as the following: The catalyst system should be easy to prepare and give a high yield of polymer, which should contain a very large isotactic fraction. The catalyst system should moreover use polymers having special morphological properties, for example a uniform particle size and/or a reduction in the fractions of very small particles and/or a high bulk density. In addition to these parameters which are important for controlling the polymerization systems, working up the polymers and/or processing them, a low halogen content of the polymer is also important, particularly in view of corrosion problems, and can be achieved by increasing the polymer yield and/or by a catalyst system which contains very little halogen.

EP-A 306 867 describes a catalyst system comprising titanium, aluminum and a silane component, the titanium component consisting of a special carrier, a certain alkanol, titanium tetrachloride and a specially selected phthalic acid derivative. In the preparation of this titanium component, however, intermediates must be repeatedly isolated, resulting in disadvantages in terms of process engineering. Furthermore, the polymer yield is still unsatisfactory.

It is an object of the present invention to overcome the stated disadvantages.

We have found that this object is achieved by a catalyst system which contains a titanium component (1) prepared in a particular manner from (I) a special carrier which has been obtained in a defined manner from (Ia) for a certain finely divided finely silica gel which has a relatively high moisture content, (Ib) a certain organomagnesium compound and (Ic) a certain gaseous chlorinating agent, and (II) a certain alkanol, (III) titanium tetrachloride and (IV) a specially selected phthalic acid derivative.

The present invention accordingly relates to a process for the preparation of homopolymers of propene and copolymers of propene with minor amounts of $C_2$–$C_{12}$-α-monoolefins, in particular $C_2$–$C_6$-α-monoolefins, by polymerization of the monomer or monomers at from 20° to 160° C., in particular from 50° to 120° C., and from 1 to 100, in particular from 20 to 70, bar by means of a Ziegler-Natta catalyst system comprising (1) a titanium component which is based on a finely divided, shape-imparting silica gel and contains titanium, magnesium, chlorine and a benzenecarboxylic acid derivative, (2) an aluminum component of the formula $$AlR_3$$

where R is alkyl of not more than 8, in particular not more than 4, carbon atoms, and (3) a silane component of the formula $$R_n^1Si(OR^2)_{4-n}$$

where $R^1$ is a saturated aliphatic and/or aromatic hydrocarbon radical of not more than 16, preferably not more than 10, carbon atoms, $R^2$ is alkyl of not more than 15, preferably not more than 8, in particular not more than 4, carbon atoms and n is from 0 to 3, preferably from 0 to 2, in particular 1 or 2, with the provisos that the atomic ratio of titanium from the titanium component (1) to aluminum from the aluminum component (2) is from 1:10 to 1:800, in particular from 1:20 to 1:300, and a molar ratio of the aluminum component (2) to the silane component (3) is from 1:0.01 to 1:0.8, in particular from 1:0.02 to 1:0.5.

In the novel process, the titanium component (1) used is one which is obtained by a method in which first (1.1) in a first stage, (I) a carrier prepared from (Ia) a finely divided silica gel which has a particle diameter of from 1 to 1,000 μm, preferably from 5 to 500 μm, in particular from 10 to 200 μm, a pore volume of from 0.3 to 5.0, in particular from 1.0 to 3.0 cm$^3$/g and a surface area of from 100 to 1,000, in particular from 200 to 500, m$^2$/g, is of the formula $SiO_2.aAl_2O_3$, where a is from 0 to 2, in particular from 0 to 0.5, and possesses a moisture content such that it loses from 1 to 20, preferably from 2 to 15, in particular from 4 to 10, % by weight, based on the initial total weight of the silica gel, of water at 1000° C. in the course of 0.5 hour, (Ib) an organomagnesium compound of the formula $MgR^3R^4$, where $R^3$ and $R^4$ are each $C_2$–$C_{10}$-alkyl, preferably $C_4$–$C_8$-alkyl, and (Ic) a gaseous chlorinating agent of the formula ClZ, where Z is Cl or H, preferably H, in a manner such that first (1.1.1) in a first substage, the finely divided silica gel (Ia) and the organomagnesium compound (Ib) are combined in a liquid inert hydrocarbon, in particular an alkane, with constant thorough mixing at from 10° to 120° C., in particular from 20° to 100° C., from 1 to 10, in particular from 1.5 to 5, molar parts of the organomagnesium compound (Ib) being used by 10 molar parts of silicon of the silica gel (Ia), and the combined substances are preferably kept at from 20° to 140° C., in particular from 60° to 90° C., preferably for from 0.5 to 5, in particular from 1 to 2, hours, then (1.1.2) in a second substage, the gaseous chlorinating agent (Ic) is passed into the mixture obtained from the first substage, with constant thorough mixing preferably at from −20° to +80° C., in particular from 0° to +60° C., from 2 to 40, in particular from 5 to 20, molar parts of the chlorinating agent (Ic) being used per molar part of the organomagnesium compound (IIb), and the entire mixture is preferably kept at a temperature in the stated range for from 0.5 to 5 hours, in particular from 0.5 to 1 hour, thereafter (1.2) in a second stage, a solid-phase intermediate is prepared from (I) the carrier obtained in the first stage, (II) a $C_2$-$C_6$-alkanol, in particular ethanol, (III) titanium tetrachloride and (IV) a phthalic acid derivative of the formula

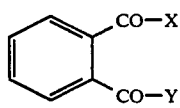

where X and Y together are oxygen or X and Y are each chlorine or $C_1$-$C_{10}$-alkoxy, preferably $C_1$-$C_8$-alkoxy, in particular butoxy, in a manner such that first (1.2.1) in a first substage, the carrier (I) and the alkanol (II) are combined in a liquid inert hydrocarbon, in particular alkane, with constant thorough mixing, preferably at room temperature, from 1 to 5, in particular from 2.5 to 3.5, molar parts of the alkanol (II) being used per molar part of magnesium of the carrier (I), and the combined substances are preferably kept at from 20° to 140° C., in particular from 70° to 90° C., preferably for from 0.5 to 5, in particular from 1 to 2, hours, then (1.2.2) in second substage, the titanium tetrachloride (III) is introduced into the reaction mixture resulting from the first substage, with constant thorough mixing, preferably at room temperature, from 2 to 20, in particular from 4 to 8, molar parts of the titanium tetrachloride (III) being used per molar part of magnesium of the carrier (I), and the combined substances are preferably kept at from 10° to 150° C., in particular from 90° to 120° C., preferably for from 0.5 to 5, in particular from 1 to 2, hours, with the proviso that the phthalic acid derivative (IV) is introduced at least in the course of one of the substages (1.2.1) or (1.2.2), from 0.01 to 1, preferably from 0.1 to 0.4, in particular from 0.25 to 0.35, molar part of the phthalic acid derivative (IV) being used per molar part of magnesium of the carrier (I), then (1.3) in a third stage, the solid-phase intermediate obtained from the second stage is subjected, at from 100° to 150° C., in particular from 115° to 135° C., for a period of from 0.2 to 5, in particular from 1.5 to 3, hours, to a one-stage or multistage or continuous extraction of titanium tetrachloride or the mixture of titanium tetrachloride and an alkylbenzene of up to 12, preferably up to 10, carbon atoms, in particular ethylbenzene, whose content of titanium tetrachloride is at least 5, in particular at least 10, % by weight, a total of from 10 to 1,000, preferably from 20 to 800, in particular from 40 to 300, parts by weight of the extraction agent being used per 10 parts by weight of the solid-phase intermediate obtained in the second stage, and finally (1.4) in a fourth stage, the solid-phase product formed in the third stage is washed with a liquid inert hydrocarbon, in particular an alkane, until the hydrocarbon contains less than 2, preferably less than 1, % by weight of titanium tetrachloride, and the titanium component (I) is thus obtained.

It has been found that the novel process can be carried out particularly successfully if a catalyst system is used whose silane component (3) is one of the formula $$R_n^1 Si(OR^2)_{4-n}$$

where $R^1$ is phenyl or $C_1$-$C_4$-alkyl preferably methylphenyl or ethylphenyl, especially p-methylphenyl, $R^2$ is alkyl of not more than 4 carbon atoms, especially methyl or ethyl, and n is 1 or 2.

Regarding the novel process, the following may be stated specifically:

Taking into account the typical special features, the polymerization process as such can be carried out in virtually all relevant conventional technological embodiments, for example as a discontinuous, cyclic or, in particular, continuous process, preferably as a suspension polymerization. The technological embodiments mentioned, i.e. the technological variants of the polymerization of α-monoolefins by the Ziegler-Natta method, are well known from the literature and in practice, so that further statements in this respect are unnecessary.

For the sake of completeness, it should be mentioned that, in the novel process, it is also possible to regulate the molecular weights of the polymer by the relevant conventional measures, for example by means of regulators, in particular hydrogen.

Regarding the composition of the novel catalyst systems, the following may be stated specifically:

(1) The finely divided silica (Ia) to be used for the preparation of the titanium component is in general an aluminosilicate or, in particular, a silica; it is important that it has the required properties. It has been found that the commercially available silica gels which meet the stated specification and are conventionally used for carriers are suitable. It is particularly important that the silica gel has a moisture content such that it loses from 1 to 20, preferably from 2 to 15, in particular from 4 to 10, % by weight, based on the initial total weight of the silica gel, of water at 1000° C. in the course of 0.5 hour (method of measurement: differential thermogravimetry).

The organomagnesium compound (Ib) likewise to be used may be dibutylmagnesium, dihexylmagnesium or, in particular, butyloctylmagnesium.

The gaseous chlorinating agent (Ic) furthermore to be used should be as dry and pure as possible; it consists of chlorine or, in particular, hydrogen chloride.

A liquid inert hydrocarbon which serves as an assistant may be a hydrocarbon of the type which is usually combined with titanium components for catalyst systems of the Ziegler-Natta type without damaging the catalyst system or its titanium component. Examples of suitable hydrocarbons are pentanes, hexanes, heptanes, gasolines and cyclohexane.

The alkanols (II) to be used for the preparation of the titanium component (I) may be commercial ones; they should advantageously have relatively high purities. For example ethanol, n-propyl alcohol, isopropyl alcohol, n-butyl alcohol, iso-butyl alcohol or tert-butyl alcohol is suitable; ethanol is particularly suitable.

The titanium tetrachloride (III) likewise to be used for the preparation of the titanium component (1) should be one which is conventionally used in Ziegler-Natta catalyst systems; the hydrocarbon which may have to be used as a mixture with titanium tetrachloride should be as pure and dry as possible.

The phthalic acid derivative (IV) to be used, which is defined in detail above, may also be a commercial one; it should advantageously have a high purity. It has been found that dibutyl phthalate is very particularly suitable for the purpose according to the invention; however, other dialkyl phthalates and phthalic anhydride and phthaloyl dichloride are also suitable.

The hydrocarbon to be used for the preparation of the titanium component (1) in stage (1.4) may likewise be a conventional one; it should advantageously have a relatively high purity.

The preparation of the titanium component (1) is simple and is possible for the skilled worker without explanations. Regarding stages (1.1) and (1.2), it is merely necessary to state that the resulting solid in each case is not isolated, and in particular care should be taken to ensure that the total liquid phase remains in the reaction vessel in stage (1.1.2), and stage (1.2) is started without separating off the liquid phase.

In stage (1.1.2), the solid-phase intermediate should remain wet with at least 5% of the liquid phase and should on no account be isolated in dry form.

In stage (1.3), the solid-phase intermediate can be isolated, for example by filtration, but it should not be dried.

(2) Suitable aluminum components (2) of the stated formula are the relevant conventional ones of this formula; they are well known from the literature and in practice, so that they need not be described further. An outstanding typical example is triethylaluminum.

(3) The silane component (3) which completes the catalyst system is, in particular, a trialkoxyalkylphenylsilane or a dialkoxyalkylphenylsilane of the stated formula. Outstanding typical examples are triethoxytoluylsilane and dimethoxyditoluylsilane; other examples are triethoxyethylphenylsilane, trimethoxytoluylsilane and diethoxyditoluylsilane.

The novel process makes it possible to prepare, in an advantageous manner, homo- and copolymers, for example of the binary or ternary type, including block copolymers, of propene with minor amounts of other $C_2$-$C_{12}$-$\alpha$-monoolefins, $\alpha$-monoolefins which are particularly suitable as comonomers for polymerization being ethene, but-1-ene, 4-methylpent-1-ene and hex-1-ene; however, other suitable examples are n-oct-1-ene, n-dec-1-ene and n-dodec-1-ene.

EXAMPLE 1 PREPARATION OF POLYPROPYLENE A) PREPARATION OF THE TITANIUM COMPONENT (1) FIRST (1.1) in a first stage, (I) a carrier was prepared from (Ia) a finely divided silica gel which had a particle diameter of from 20 to 45 μm, a pore volume of 1.75 cm$^3$/g and a surface area of 320 m$^2$/g, was of the formula $SiO_2$ and possessed a moisture content such that it lost 7.4% by weight, based on the initial total weight of the silica gel, of water at 1000° C. in the course of 0.5 hour (method of measurement: differential thermogravimetry), (Ib) butyloctylmagnesium and (Ic) hydrogen chloride, in a manner such that first (1.1.1) in a first substage, the finely divided silica gel (Ia) and the organomagnesium compound (Ib) were combined in n-heptane with constant thorough mixing by means of stirring at room temperature, 5.0 molar parts of the organomagnesium compound (Ib) being used by 10 molar parts of silicon of the silica gel (Ia), and the combined substances were kept at 90° C. for 1.5 hours, then (1.1.2) in a second substage, the gaseous chlorinating agent (Ic) was passed into the mixture obtained from the first substage, with constant thorough mixing by means of stirring at 20° C., 10 molar parts of the chlorinating agent (Ic) being used per molar part of the organomagnesium compound (Ib), and the entire mixture was kept at a temperature in the stated range for 0.5 hour, thereafter (1.2) in a second stage, a solid-phase intermediate was prepared from (I) the carrier obtained in the first stage, (II) ethanol, (III) titanium tetrachloride and (IV) di-n-butyl phthalate, in a manner such that first (1.2.1) in a first substage, the carrier (I) and the ethanol (II) were combined in n-heptane with constant thorough mixing by means of stirring at room temperature, 3 molar parts of the ethanol (II) being used per molar part of magnesium of the carrier (I), and the combined substances were kept at 80° C. for 1.5 hours, then (1.2.2) in a second substage, the titanium tetrachloride (III) was introduced into the reaction mixture resulting from the first substage, with constant thorough mixing by means of stirring at room temperature, 6 molar parts of the titanium tetrachloride (III) being used per molar part of magnesium of the carrier (I), the di-n-butyl phthalate was then introduced, 0.30 molar part of the phthalate (IV) being used per molar part of magnesium of the carrier (I), and the mixture obtained in the first substage, i.e. the combined substances, was kept at 120° C. for 2 hours, then (1.3) in a third stage, the solid-phase intermediate obtained from the second stage was subjected, at 125° C. for a period of 2 hours, to a continuous extraction of titanium tetrachloride and ethylbenzene, whose content of titanium tetrachloride was 15% by weight, 140 parts by weight of the titanium tetrachloride/ethylbenzene mixture being used per 10 parts by weight of the solid-phase intermediate obtained from the second stage, and the resulting solid-phase intermediate was then isolated by means of filtration, and finally (1.4) in a fourth stage, the solid-phase product obtained in the third stage was washed with n-heptane until the n-heptane contained less than 0.3% by weight of titanium tetrachloride, and the titanium component (I) was thus obtained; it contained 2.6% by weight of titanium, 9.7% by weight of magnesium and 32.2% by weight of chlorine.

14 hours were required for the preparation of a titanium component.

b) Polymerization

A steel autoclave having a volume of 10 l and equipped with a stirrer was charged with 50 g of polypropene powder, 10 mmol of triethylaluminum (in the form of a 1 molar solution in n-heptane) as aluminum component (2), 1 mmol of triethoxytoluylsilane (in the form of a 1 molar solution in n-heptane) as silane component (3), 5 liters (S.T.P.) of hydrogen and finally 100 mg ($\triangleq$0.05 mmol of titanium) of the titanium component (1) described above, at 30° C. The reaction temperature was brought to 70° C. in the course of 10 minutes and the reactor pressure was brought to 28 bar in this time by forcing in gaseous propylene.

The actual polymerization was carried out with constant stirring at 70° C. and 28 bar in the course of 2 hours, and monomer consumed during this procedure was replaced continuously with fresh monomer.

COMPARATIVE EXAMPLE V1

The procedure was as in Example 1, except that, both in stage (1.1.2) and in stage (1.2.2), the solid-phase intermediate was isolated with removal of the liquid phase and was used as an isolated solid in the next stage.

24 hours were required for the preparation of the titanium component. Furthermore, apparatuses were required for drying and for solids metering.

The productivities of the catalyst component (1), the heptane-soluble fractions (as a measure of the isotacticity), the particle size distributions and the chlorine contents of the resulting polypropylenes are summarized in the Table below.

TABLE

|  | Example 1 | Comp. Exp. V1 |
|---|---|---|
| Productivity [g of polypropylene/g of catalyst] | 20,000 | 17,000 |
| Heptane-soluble fraction [% by wt.] | 1.6 | 1.6 |
| Particle size distribution [mm]: | | |
| <0.25 | 3.6 | 4.5 |
| 0.25–0.50 | 7.1 | 6.8 |
| 0.50–1.00 | 25.0 | 28.6 |
| 1.00–2.00 | 62.0 | 58.1 |
| >2.00 | 2.3 | 2.0 |
| Chlorine content [ppm] | 16 | 19 |

We claim:

1. A process for the preparation of a homopolymer of propene or a copolymer of propene with minor amounts of other $C_2$–$C_{12}$-α-monoolefins by polymerization of the monomer or monomers at from 20° to 160° C. and from 1 to 100 bar by means of a Ziegler-Natta catalyst system consisting essentially of (1) a titanium component which is based on a finely divided, shape-imparting silica gel and contains titanium, magnesium, chlorine and a benzenecarboxylic acid derivative, (2) an aluminum component of the formula $$AlR_3$$

where R is alkyl of not more than 8 carbon atoms, and (3) a silane component of the formula $$R_n^1 Si(OR^2)_{4-n}$$

where $R^1$ is, methylphenyl or ethylphenyl, $R^2$ is methyl or ethyl and n is 1 or 2.

with the provisos that the atomic ratio of titanium from the titanium component (1) to aluminum from the aluminum component (2) is from 1:10 to 1:800 and a molar ratio of the aluminum component (2) to the silane component (3) is from 1:0.01 to 1:0.8, wherein the titanium component (1) used is one which is obtained by a method in which first (1.1) in a first state, (I), a carrier is prepared from (Ia) a finely divided silica gel which has a particle diameter of from 1 to 1,000 μm, a pore volume of from 0.3 to 5 cm³/g and a surface area of from 100 to 1,000 m²/g, is of the formula $SiO_2.aAl_2O_3$, where a is from 0 to 2 and possesses a moisture content such that it loses from 1 to 20% by weight, based on the initial total weight of the silica gel, of water at 1000° C. in the course of 0.5 hour, (Ib) an organomagnesium compound of the formula $MgR^3R^4$, where $R^3$ and $R^4$ are each $C_2$–$C_{10}$-alkyl and (Ic) a gaseous chlorinating agent of the formula ClZ, where Z is Cl or H, in a manner such that first (1.1.1) in a first substage, the finely divided silica gel (Ia) and the organomagnesium compound (Ib) are combined in a liquid inert hydrocarbon with constant thorough mixing at from 10° to 120° C., from 1 to 10 molar parts of the organomagnesium compound (Ib) being used by 10 molar parts of silicon of the silica gel (Ia), and the combined substances are then kept at from 20° to 140° C. for from 0.5 to 5 hours, then (1.1.2) in a second substage, the gaseous chlorinating agent (Ic) is passed into the mixture obtained from the first substage with constant thorough mixing, from 2 to 40 molar parts of the chlorinating agent (Ic) being used per molar part of the organomagnesium compound (Ib), thereafter (1.2) in a second stage, a solid-phase intermediate is prepared from (I), the carrier obtained in the first stage (II), a $C_2$–$C_8$-alkanol, (III) titanium tetrachloride and (IV) a phthalic acid derivative of the formula

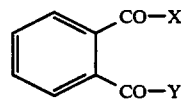

where X and Y together are oxygen or X and Y are each chlorine or $C_1$–$C_{10}$-alkoxy, in a manner such that first (1.2.1) in a first substage, the carrier (I) and the alkanol (II) are combined in a liquid inert hydrocarbon with constant thorough mixing, from 1 to 5 molar parts of the alkanol (II) being used per molar part of magnesium of the carrier (I), and the combined substances are kept at from 20° to 140° C. for from 0.5 to 5 hours, then (1.2.2) in a second substage, the titanium tetrachloride (III) is introduced into the reaction mixture resulting from the first substage with constant thorough mixing, from 2 to 20 molar parts of the titanium tetrachloride (III) being used per molar part of magnesium of the carrier (I), with the proviso that the phthalic acid derivative (IV) is introduced at least in the course of one of the substages (1.2.1) or (1.2.2), from 0.01 to 1 molar part of the phthalic acid derivative (IV) being used per molar part of magnesium of the carrier (I), then (1.3) in a third stage, the solid-phase intermediate obtained from the second stage is subjected, at from 100° to 150° C. for a period of from 0.2 to 5 hours, to a one-stage or multistage or continuous extraction of titanium tetrachloride or with a mixture of titanium tetrachloride and an alkylbenzene of up to 12 carbon atoms, whose content of titanium tetrachloride is at least 5% by weight, a total of from 10 to 1,000 parts by weight of the extraction agent being used per 10 parts by weight of the solid-phase intermediate obtained from the second stage, and finally (1.4) in a fourth stage, the solid-phase produce formed in the third stage is washed with a liquid inert hydrocarbon until the hydrocarbon contains less than 2% by weight of titanium tetrachloride, and the titanium component (I) is thus obtained.

* * * * *

UNITED STATES PATENT AND TRADEMARK OFFICE
CERTIFICATE OF CORRECTION

PATENT NO.: 5,288,824

DATED: February 22, 1994

INVENTOR(S): KERTH et al.

It is certified that error appears in the above-identified patent and that said Letters Patent is hereby corrected as shown below:

In the Abstract, line 2, insert "a" before "titanium".

In the Abstract, line 4, "titan- ium" should be --titanium--.

Signed and Sealed this

Twenty-seventh Day of September, 1994

Attest:

BRUCE LEHMAN

Attesting Officer     Commissioner of Patents and Trademarks